United States Patent
Rowe et al.

(10) Patent No.: US 8,326,679 B1
(45) Date of Patent: Dec. 4, 2012

(54) GENERATING CONTAINER PLANS FOR MULTI-ITEM ORDERS

(75) Inventors: Sarah T. Rowe, Seattle, WA (US); Ward W. Vuillemot, Seattle, WA (US); Dennis Lee, Mercer Island, WA (US); Paul N. Haake, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 267 days.

(21) Appl. No.: 12/765,163

(22) Filed: Apr. 22, 2010

(51) Int. Cl.
*G06Q 10/00* (2012.01)

(52) U.S. Cl. .............. 705/7.38; 705/26.81; 705/26.2; 705/28; 705/7.22; 705/330

(58) Field of Classification Search .......... None
See application file for complete search history.

(56) References Cited

U.S. PATENT DOCUMENTS

| | | | | |
|---|---|---|---|---|
| 5,834,706 | A * | 11/1998 | Christ ......................... | 177/1 |
| 6,876,958 | B1 * | 4/2005 | Chowdhury et al. ........... | 703/7 |
| 7,136,830 | B1 * | 11/2006 | Kuelbs et al. .................. | 705/26.2 |
| 7,979,359 | B1 * | 7/2011 | Young et al. .................. | 705/332 |
| 8,086,344 | B1 * | 12/2011 | Mishra et al. ................. | 700/214 |
| 2001/0018669 | A1 * | 8/2001 | Fujiwara ...................... | 705/26 |
| 2002/0133395 | A1 * | 9/2002 | Hughes et al. ................ | 705/11 |
| 2002/0178074 | A1 * | 11/2002 | Bloom ......................... | 705/26 |
| 2003/0074250 | A1 * | 4/2003 | Burk ............................ | 705/10 |
| 2003/0149644 | A1 * | 8/2003 | Stingel et al. ................. | 705/28 |
| 2003/0195824 | A1 * | 10/2003 | Duffy et al. .................. | 705/26 |
| 2003/0200111 | A1 * | 10/2003 | Damji .......................... | 705/1 |
| 2004/0230601 | A1 * | 11/2004 | Joao et al. .................... | 707/102 |
| 2004/0258807 | A1 * | 12/2004 | Pape et al. .................... | 426/132 |
| 2005/0137923 | A1 * | 6/2005 | Mosbrucker .................. | 705/8 |
| 2005/0197876 | A1 * | 9/2005 | Benda et al. .................. | 705/7 |
| 2006/0089869 | A1 * | 4/2006 | Mundy ......................... | 705/11 |
| 2007/0136150 | A1 * | 6/2007 | Biancavilla et al. .......... | 705/28 |
| 2007/0174146 | A1 * | 7/2007 | Tamarkin et al. ............. | 705/28 |
| 2009/0037245 | A1 * | 2/2009 | Gabrielson ................... | 705/8 |
| 2009/0048987 | A1 * | 2/2009 | Sweeney et al. .............. | 705/400 |
| 2009/0074545 | A1 * | 3/2009 | Lert et al. ..................... | 414/276 |
| 2010/0241253 | A1 * | 9/2010 | Edwards ....................... | 700/90 |
| 2011/0173034 | A1 * | 7/2011 | Riepshoff et al. ............ | 705/7.11 |

OTHER PUBLICATIONS

Javier Faulin, Pablo Sarobe, & Jorge Simal. (2005). The DSS LOGDIS Optimizes Delivery Routes for FRILAC's Frozen Products. Interfaces, 35(3), 202-214.*

(Continued)

*Primary Examiner* — Gurkanwaljit Singh
(74) *Attorney, Agent, or Firm* — Hope Baldauff Hartman, LLC

(57) ABSTRACT

Technologies are described herein for generating container plans for multi-item orders. The items of the order are divided into zones, where the zones may determine the picking zone and/or packaging requirements for the item. Zone-based container plans are generated for the items in the order associated with each individual zone. The container plan includes an assignment of each item to one or more logical shipping containers. A mixed container plan is also generated for all the items in the order regardless of the associated zone. If the number of logical shipping containers in the mixed container plan is less than the total number of logical shipping containers in the zone-based container plans, then a final container plan for the order is generated from the mixed container plan. Otherwise, the final container plan is generated by combining the zone-based plans for each zone associated with items in the order.

21 Claims, 7 Drawing Sheets

OTHER PUBLICATIONS

Emmanual D. Chajakis, & Monique Guignard. (2003). Scheduling Deliveries in Vehicles with Multiple Compartments. Journal of Global Optimization, 26(1), 43-78.*

Popescu, Andreea (2006). Air cargo revenue and capacity management. Ph.D. dissertation, Georgia Institute of Technology, United States—Georgia.*

Moussawi, Lama (2006). Demand and supply matching with applications in air cargo and retail industries. Ph.D. dissertation, The University of Texas at Dallas, United States—Texas.*

Hwang, Seung-June (2005). Inventory constrained maritime routing and scheduling for multi-commodity liquid bulk. Ph.D. dissertation, Georgia Institute of Technology, United States—Georgia.*

* cited by examiner

GENERATING CONTAINER PLANS FOR MULTI-ITEM ORDERS

BACKGROUND

Many types of products may be ordered over the phone or online for delivery directly to a customer, including grocery items and other consumables. Efficient handling and shipping of consumable products may present special challenges to merchants of such products. For example, orders for grocery items may consist of a larger number of items in a variety of sizes and weights. The different items may also have different handling and packaging requirements. For example, ambient items, such as dry goods, may be stored in one part of the warehouse and may require bagging, based on customer preference, before being placed in a shipping container. Frozen or chilled items, such as ice cream or orange juice, may be stored in a different part of the warehouse and require packaging with cold packs or other special materials to ensure these items remain cold up to delivery. In addition, because of the perishable nature of many grocery items, these products may need to be picked from inventory and packed for shipping very close to the time of delivery.

Traditional handling and shipping methods for such items may require one or more items to be picked from inventory and moved to a packing location, where the items are packed in shipping containers for shipping to the customer. This may not be efficient, however, since the items are handled by inventory personnel multiple times in the picking and packing process. Further, the items may be packed separately in separate shipping containers if they are picked from different areas of the warehouse at different times, creating an inefficient use of shipping container space and a waste of packaging and container supplies.

It is with respect to these and other considerations that the disclosure made herein is presented.

DETAILED DESCRIPTION

Figure 1:
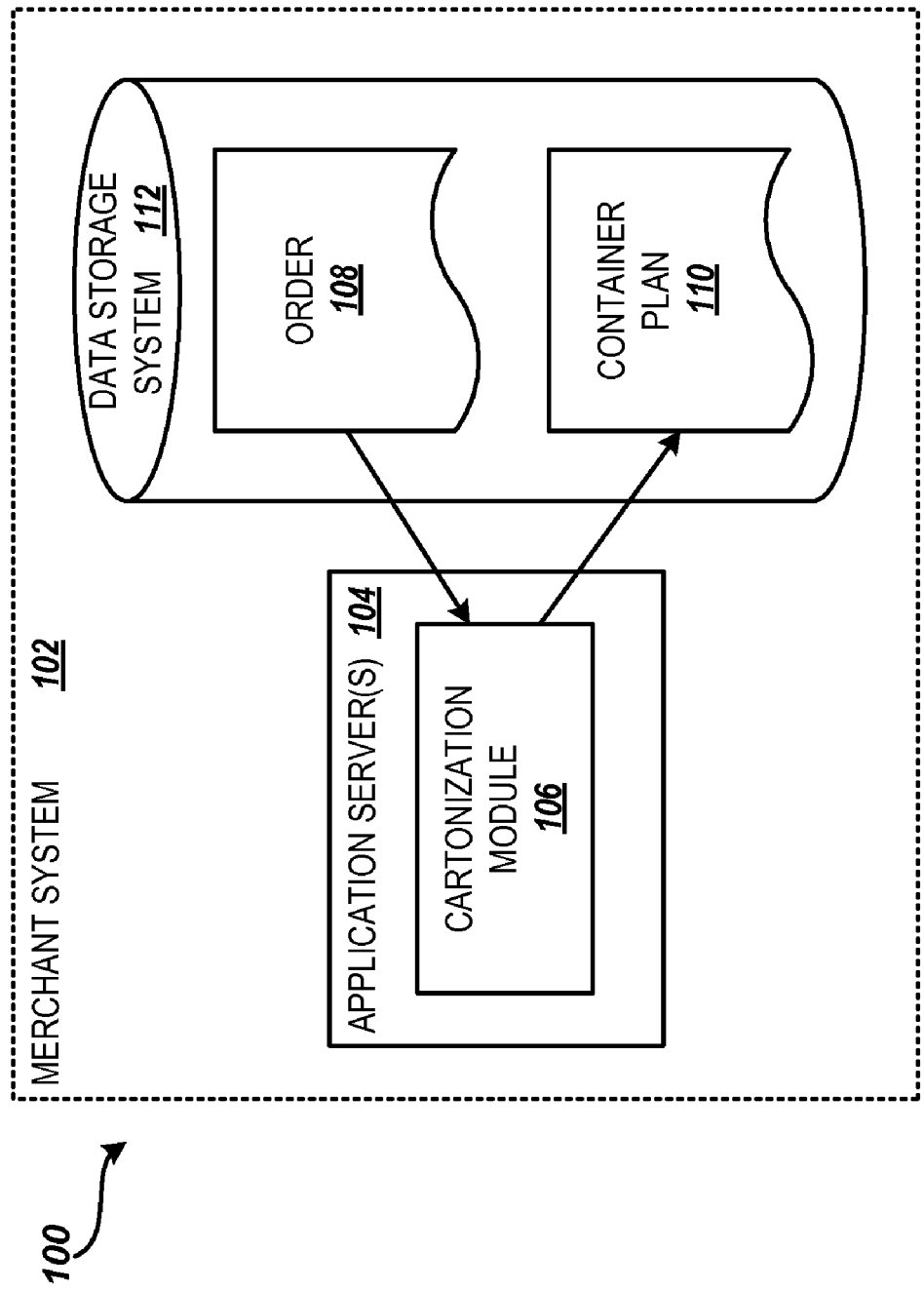
FIG. 1 is a system and network diagram showing aspects of an illustrative operating environment for generating container plans for multi-item orders, including several software and hardware components provided by embodiments presented herein.

The following detailed description is directed to technologies for generating container plans for multi-item orders. Utilizing the embodiments described herein, a container plan assigning the items of an order to shipping containers may be generated from the order. The algorithm utilized to generate the container plan may result in an increase in packing density of the containers and a reduction of the number of shipping containers and associated packaging supplies required for shipment, thus lowering the cost of shipping of the order to the customer. In addition, the container plan may allow the items of the order to be picked from inventory and packed into the assigned container in a single step, eliminating the re-packing process, and thus reducing the packing and handling costs associated with fulfilling the order.

According to embodiments, the items of the order are first divided into zones, where the zones determine the picking zone and/or packaging requirements for the item, for example. Zone-based container plans are generated for the items in the order associated with each individual zone. The container plan may include an assignment of each item associated with the zone to one or more logical containers allocated to the plan. A mixed container plan is also generated for all the items in the order regardless of the associated zone. If the number of logical containers allocated to the mixed container plan is less than the total number of logical containers allocated to the zone-based container plans, then a final container plan for the order is generated from the mixed container plan. Otherwise, the final container plan is generated by combining the zone-based plans for each zone associated with items in the order.

It should be appreciated that the subject matter presented herein may be implemented as a computer process, a computer-controlled apparatus, a computing system, or an article of manufacture, such as a computer-readable storage medium. These and various other features will become apparent from a reading of the following disclosure and a review of the associated drawings.

While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced on or in conjunction with other computer system configurations beyond those described below, including multiprocessor systems, microprocessor-based or programmable consumer electronics, minicomputers, mainframe computers, handheld computers, personal digital assistants, electronic book readers, cellular telephone devices, special-purposed hardware devices, network appliances, and the like. The embodiments described herein may also be practiced in distributed computing environments, where tasks are performed by remote processing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures.

FIG. 1 and the following description are intended to provide a brief, general description of a suitable computing environment in which the embodiments described herein may be implemented. In particular, FIG. 1 is a system and network diagram that shows an illustrative operating environment 100 including several software components for generating container plans for multi-item orders, according to embodiments provided herein. The environment 100 includes a number of application servers 104 that provide various application services to a merchant system 102. The application servers 104 may execute a number of modules in order to provide the services to a merchant system 102. The modules may execute on a single application server 104 or in parallel across multiple application servers in the merchant system 102. In addition, each module may consist of a number of subcomponents executing on different application servers 104 or other computing devices in the merchant system 102. The modules may be implemented as software, hardware, or any combination of the two.

A cartonization module 106 executes on the application servers 104. According to embodiments, the cartonization module 106 generates a container plan 110 for a corresponding order 108 in the merchant system 102, as will be described in more detail below in regard to FIGS. 4-6B. The order 108 may be a data structure that stores information regarding items purchased by a customer for delivery, as will be described in more detail below in regard to FIG. 2. The order 108 may be created in the merchant system 102 by other modules executing on the application servers 104. For example, one or more modules may execute on the application servers 104 that provide a customer-facing website, allowing customers to browse and search products available to purchase, select items and specify quantities of the items desired, create an order 108 for delivery of selected items, specify a delivery date and address for the order, and the like. The order 108 may be stored in a data storage system 112, such as a database server, that is accessible by the application servers 104 and other components of the merchant system 102.

The container plan 110 generated by the cartonization module 106 may be a data structure that stores the assignment of items in the order 108 to one or more logical shipping containers, as will be described in more detail below in regard to FIG. 3. Once generated, the container plan 110 may be stored in the data storage system 112 for access by other modules of the merchant system 102. For example, the container plan 110 may be utilized by one or more modules executing on the application servers 104 to determine the number of shipping containers needed for an order for calculating shipping costs, generate picking/packing lists for actual shipping containers corresponding to the logical containers, perform capacity planning and order delivery scheduling, and the like.

Figure 3:
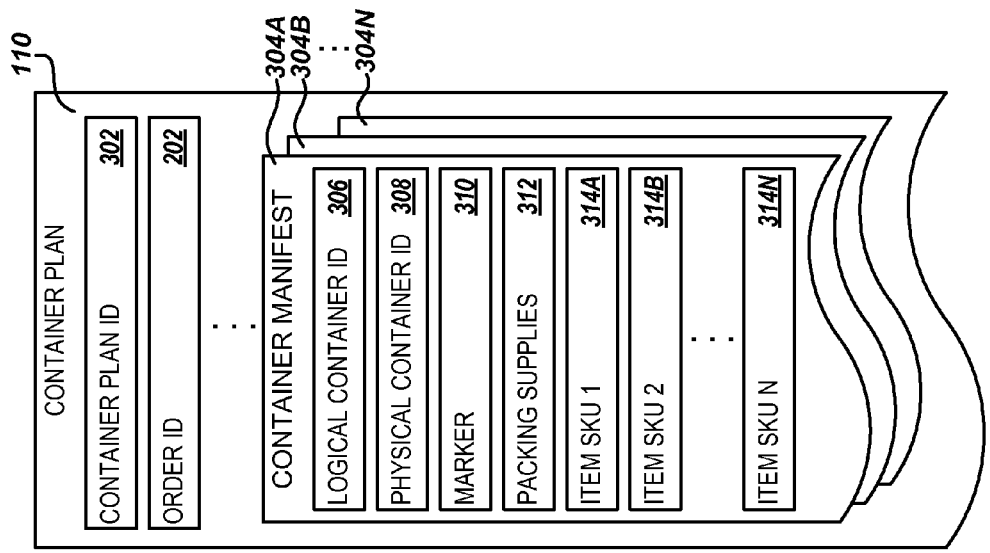
FIG. 3 is a data structure diagram illustrating a number of data elements maintained for a container plan, according to embodiments presented herein.
Figure 2:
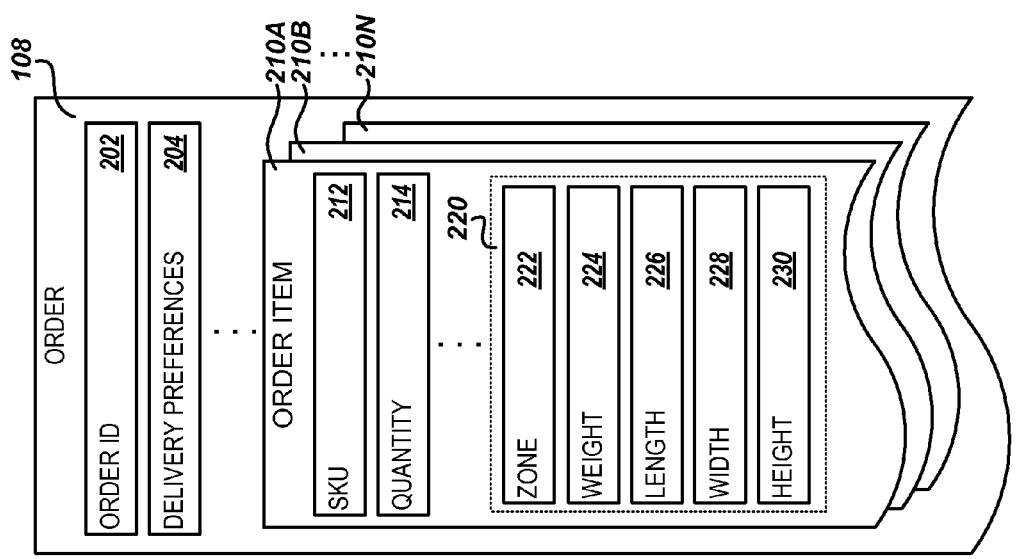
FIG. 2 is a data structure diagram illustrating a number of data elements maintained for an order, according to embodiments presented herein.

FIGS. 2 and 3 are data structure diagrams showing a number of data elements stored in a data structure. It will be appreciated by one skilled in the art that each of the data structures shown in the figures may represent a database table, an object stored in a computer memory, a programmatic structure, or any other data container commonly known in the art. Each data element included in the data structures may represent one or more fields or columns of a database table, one or more attributes of an object, one or more member variables of a programmatic structure, or any other unit of data of a data structure commonly known in the art. The implementation is a matter of choice, and may depend on the technology, performance, and other requirements of the computing system upon which the data structures are implemented.

FIG. 2 shows one example of data elements that may be stored in the order 108, according to embodiments. As described above, the order 108 identifies the items purchased by a customer for delivery as well as parameters for delivery of the items. The order 108 may contain an order ID 202 that identifies the order to the various components and modules of the merchant system 102. The order 108 may also contain delivery preferences 204 specified by the customer for the order. For example, the delivery preferences 204 may include bagging preferences for grocery items, whether the customer must be present to receive the delivery, and the like.

The order 108 further contains one or more order items 210A-210N (also referred to herein generally as order item 210) corresponding to the items purchased by the customer. Each order item 210 contains a stock-keeping unit ("SKU") 212 identifying the item selected for delivery, along with a quantity 214 of the item ordered. According to embodiments, each order item 210 also includes inventory data 220 corresponding to the item identified by the SKU 212. It will be appreciated that the inventory data 220 corresponding to an item may be stored in another location in the merchant system 102 beyond the order item 210 as shown in FIG. 2, and may be accessed based on the SKU 212 of the order item.

The inventory data 220 may include a zone 222 associated with the order item 210. The zone 222 may provide a means of categorizing items in inventory based on their storage location in a warehouse, special handling and packaging requirements for the item, and the like. For example, for grocery items, the zone 222 may categorize items in inventory by temperature zone, such as ambient items, e.g. dry goods, chilled items, e.g. milk or butter, frozen items, e.g. ice cream, fragile items, e.g. flowers, and the like. The merchant may store chilled and frozen items in one section of the warehouse, such as in coolers, and ambient items in another area of the warehouse. Chilled and frozen items may be packed in insulated bags, along with a cold pack or other cooling device, while ambient items may be bagged based on the delivery preferences 204 specified by the customer for the order 108. Further, items associated with certain zones 222, such as chilled and ambient items, may be combined into the same shipping container for delivery, while items categorized in other zones, such as frozen, may require a special shipping container. It will be appreciated that the zone 222 associated with each order item 210 may contain categories different from or in addition to those described above, and may be used by the merchant system 102 for other purposes beyond those described herein.

The inventory data 220 may further include a weight 224 and dimensional data, such as a length 226, width 228, and height 230, for the corresponding item identified by the SKU 212. The weight 224 and dimensional data may be used by the cartonization module 106 in generating the container plans 110 from the order, as will be described in more detail below in regard to FIGS. 5-6B. For example, the cartonization module 106 may use the weight 224 and dimensions of each order item 210 to determine how many shipping containers are needed for delivery of the order 108, the sequence in which the items should be picked from inventory, the orientation and manner in which each product will be packed for shipment, and the like.

It will be appreciated that the inventory data 220 stored in the order item 210 may include additional or alternative elements beyond the zone 222, weight 224, length 226, width 228, and height 230 described herein, including, but not limited to, shape and volume of the corresponding product. It will be further appreciated that the order 108 may further contain other data elements and information necessary for the fulfillment of the order by the merchant system 102 beyond those shown in FIG. 2 and described above, such as a customer ID, a delivery address, a date and time of delivery, a payment method, and the like.

FIG. 3 shows one example of data elements that may be stored in a container plan 110 generated by the cartonization module 106 for the order 108, according to embodiments. As described above, the container plan 110 stores an assignment of each item in the order 108 to one or more logical shipping containers. The container plan 110 may be used by the merchant system 102 to determine the number of shipping containers required for delivery of the order 108, generate picking/packing lists for actual shipping containers, determine packing supplies needed for each container, perform capacity planning and order delivery scheduling, and the like. The container plan 110 may contain a container plan ID 302 that identifies the container plan to the cartonization module 106 and/or other modules of the merchant system 102. The container plan 110 may also contain the order ID 202 identifying the order 108 from which the container plan was generated. It will be appreciated that more than one container plan 110 may exist in the storage system 112 associated with a particular order 108 at any given time.

The container plan 110 also contains one or more container manifests 304A-304N (also referred to herein generally as container manifest 304) that contain assignments of the items in the order 108 to corresponding logical shipping containers. Each container manifest 304 includes a logical container ID 306 that uniquely identifies the corresponding logical shipping container within the container plan 110. The logical container ID 306 may be a sequential number or letter for each logical shipping container, for example.

Each container manifest 304 may also include a physical container ID 308. The physical container ID 308 may uniquely identify an actual shipping container that has been allocated to the order 108 and is to be packed based on the container manifest 304. For example, a merchant of grocery items may deliver orders to a customer packed in returnable totes. Each individual tote utilized by the merchant may be assigned an ID number in the merchant system 102. Inventory personnel may generate a picking/packing list for each logical shipping container in the container plan 110 for the order 108, and allocate an available tote in which to pack the items for that logical shipping container. The ID number for the selected tote may then be stored in the physical container ID 308 of the corresponding container manifest 304.

In addition to the physical container ID 308, the container manifest 304 may also include a marker 310 assigned by the inventory personnel to both the actual shipping container and the logical shipping container. The marker 310 may be a name or symbol that allows inventory personnel to quickly associate the allocated shipping container with the corresponding container manifest 304 during picking and packing of the order items. The marker 310 may be a shape name, a color name, the name of a famous person, or any other easily identifiable name or symbol.

The container manifest 304 may also contain a specification of packing supplies 312 needed to pack the items assigned to the corresponding logical shipping container. The packing supplies 312 may be determined by the cartonization module 106 based on the items assigned to the logical shipping container as well as the delivery preferences 204 specified by the customer for the corresponding order 108. For example, as described above, a merchant of grocery items may pack chilled and frozen items in insulated bags, along with a cold pack or other cooling device, and ambient items in paper or plastic bags based on the delivery preferences 204 of the customer. The packing supplies 312 may specify a particular number of insulated bags, a particular number of cold packs, a particular number of paper or plastic grocery bags, and other packing materials determined by the cartonization module 106 as required for packing the items in the shipping container.

It will be appreciated that the packing supplies 312 may specify other types of packing materials and supplies for other types of items and/or merchants, such as polystyrene foam packing filler, container taping supplies, catalogs or other marketing materials for the merchant, and the like. In addition, the packing supplies 312 may specify both pre-pick and post-pick supplies. For example, in the case of the merchant of grocery items described above, insulated bags and paper or plastic grocery bags may be pre-pick supplies to be placed into the allocated shipping container before the assigned items are to be picked from inventory and packed in the container, while cold packs may be post-pack supplies to be placed into the insulated bags after the items have been picked from inventory and just before shipment to the customer.

Each container manifest 304 also includes a list of item SKUs 314A-314N. Each of the item SKUs 314A-314N in the list identifies an individual item assigned to the corresponding logical shipping container. The cartonization module 106 determines the item SKUs 314A-314N to include in each container manifest 304 based on the zone, weight, dimensions, and other factors of the items identified in the order items 210 of the order 108 from which the container plan 110 is generated, as will be described in more detail below in regard to FIGS. 5-6B. It will be appreciated that the same SKU 212 may appear in the list of item SKUs 314A-314N multiple times in cases where a quantity 214 of more than one has been specified for a particular order item 210 in the order 108. It will be further appreciated that the container plan 110 may contain additional data elements beyond those shown in FIG. 3 and described above that are generated by the cartonization module 106 and/or used by other modules of the merchant system 102.

Turning now to FIGS. 4-6B, additional details will be provided regarding the embodiments presented herein for generating container plans for multi-item orders. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the figures and described herein. These operations may also be performed in parallel, or in a different order than those described herein.

Figure 4:
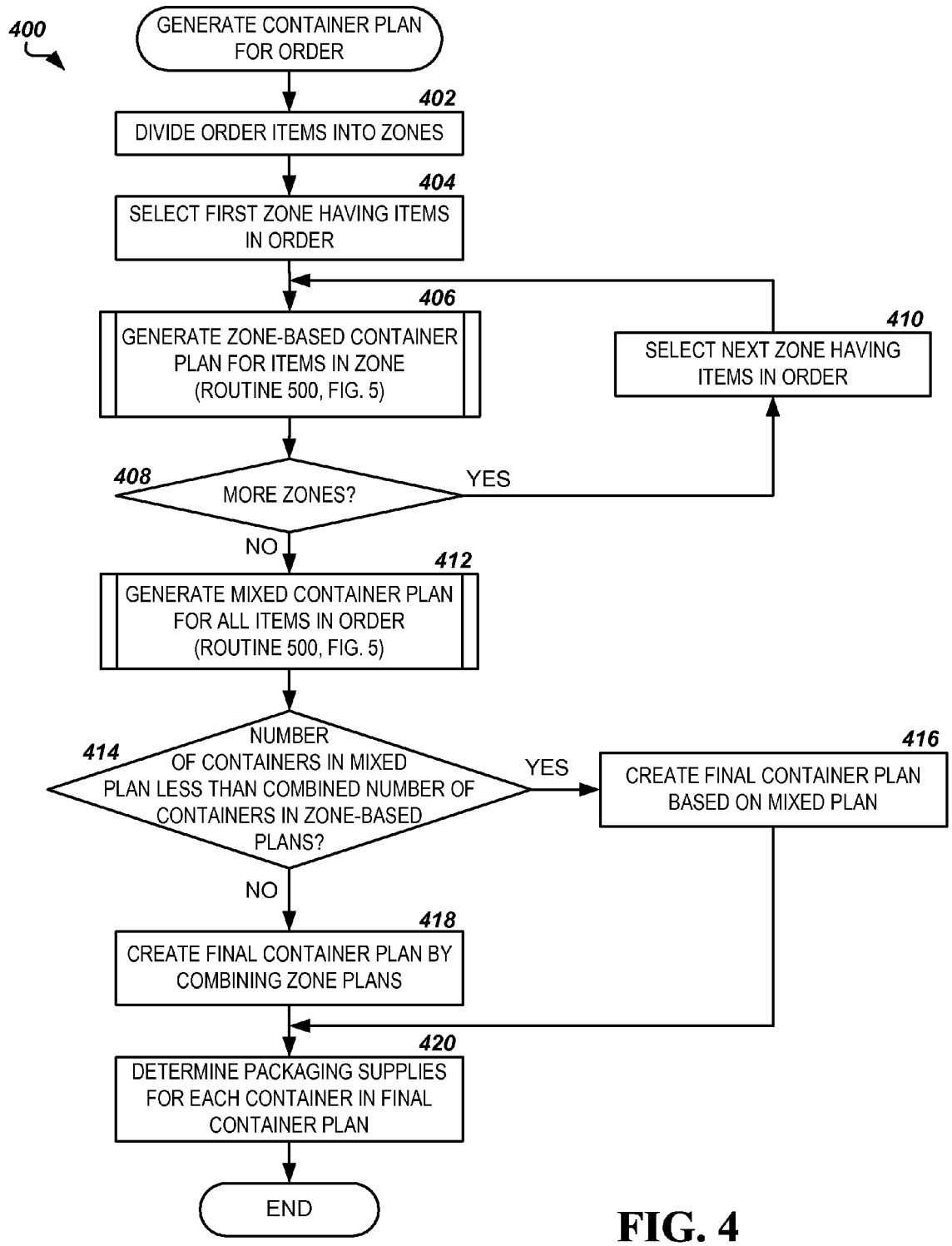
FIG. 4 is a flow diagram showing a method for generating a container plan for a multi-item order, according to embodiments described herein.

FIG. 4 illustrates a routine 400 for generating a container plan 110 for a multi-item order 108, according to embodiments described herein. In one embodiment, the routine 400 is performed by the cartonization module 106 executing on the applications servers 104 in the merchant system 102. It will be appreciated that the routine 400 may also be performed by another module or component of the merchant system 102, or by a combination of modules and components.

The routine 400 begins at operation 402, where the cartonization module 106 divides the items in the order 108 into zones for generating separate zone-based container plans 110. For example, the cartonization module 106 may first generate one container plan 110 for the chilled items and another container plan for the ambient items in an order 108 containing both chilled and ambient items. According to one embodiment, the items are divided into zones based on the zone 222 associated with the order item 210 corresponding to each item in the order 108.

The routine proceeds from operation 402 to operation 404, where the cartonization module 106 selects the first zone associated with items in the order 108. The routine 400 then proceeds to operation 406, where the cartonization module 106 generates a zone-based container plan 110 for the items associated with the first zone, as will be described below in regard to FIG. 5. From operation 406, the routine 400 proceeds to operation 408, where the cartonization module 106 determines if more zone-based container plans 110 need to be generated for the order 108. If more zones exist, the routine 400 proceeds to operation 410, where the cartonization module 106 selects the next zone associated with items in the order. Next, the routine 400 returns to operation 406, where the cartonization module 106 generates a zone-based container plan 110 for the items in the order 108 associated with next zone. The process repeats until zone-based container plans 110 have been generated for each zone associated with items in the order 108.

Once the cartonization module 106 has generated zone-based container plans for all the zones, the routine 400 proceeds from operation 408 to operation 412, where the cartonization module 106 generates a mixed container plan 110 for all the items in the order, regardless of zone, as will be described below in regard to FIG. 5. In one embodiment, multiple mixed container plans 110 may be generated utilizing different sorting algorithms for the items in order to test different optimizations, as will be described in more detail below in regard to operation 504. The mixed container plan 110 having the fewest logical shipping containers is then selected as the preferred plan. From operation 412, the routine 400 proceeds to operation 414, where the cartonization module 106 determines if the number of logical shipping containers allocated in the preferred mixed container plan 110 is less than the combined number of logical shipping containers allocated in all of the zone-based container plans generated for the order 108. This may be determined by adding the number of container manifests 304 in each zone-based container plan 110, and comparing the sum to the number of container manifests in the mixed container plan.

It will be appreciated that, if the mixed container plan 110 has fewer logical shipping containers than the combined zone-based container plans, and therefore requires fewer actual shipping containers for shipment of the order 108, then there may be cost-savings involved in picking, packing, and shipping the items in the order based on the mixed container plan. However, if the number of logical shipping containers in the mixed container plan 110 is not less than the combined number of containers in the zone-based container plans, then it may be more beneficial to pick, pack, and ship the items in each zone independently. In other embodiments, the mixed container plan 110 may be preferred over the zone-based container plans when the number of logical containers in the mixed container plan is equal to the combined zone-based container plans.

If the number of logical shipping containers in the mixed container plan 110 is less than the combined number of logical shipping containers in the zone-based container plans, the routine 400 proceeds from operation 414 to operation 416, where the cartonization module 106 creates a final container plan 110 based on the mixed container plan. In one embodiment, the preferred mixed container plan 110 may be utilized as the final container plan 110. In another embodiment, the final container plan 110 may be created by rebalancing the items assigned to the logical shipping containers of the mixed container plan generated in operation 412, as will be described below in regard to FIGS. 6A and 6B. If the number of logical shipping containers in the mixed container plan 110 is not less than the combined number of logical shipping containers in the zone-based container plans, the routine 400 proceeds from operation 414 to operation 418, where the cartonization module 106 creates a final container plan 110 by combining the zone-based container plans generated in operation 406 for each zone associated with items in the order 108. This may be accomplished by creating a single container plan 110 containing all the container manifests 304 from each zone-based container plan, for example.

From operations 416 or 418, the routine 400 proceeds to operation 420, where the cartonization module 106 determines the pre-pick and post-pick packing supplies required for each logical shipping container in the final container plan 110. As described above in regard to FIG. 3, the packing supplies for each logical shipping container may be determined based on the number of items assigned to the logical shipping container, the zone 222 corresponding to each assigned item, and the like. For example, a logical shipping container containing one or more items in the chilled zone may require at least one insulated bag, along with a cold pack for each insulated bag. Once the packing supplies for each logical shipping container is determined, the cartonization module 106 may then store the inventory of supplies in the packing supplies 312 data element in the corresponding container manifest 304. From operation 420, the routine 400 ends.

Figure 5:
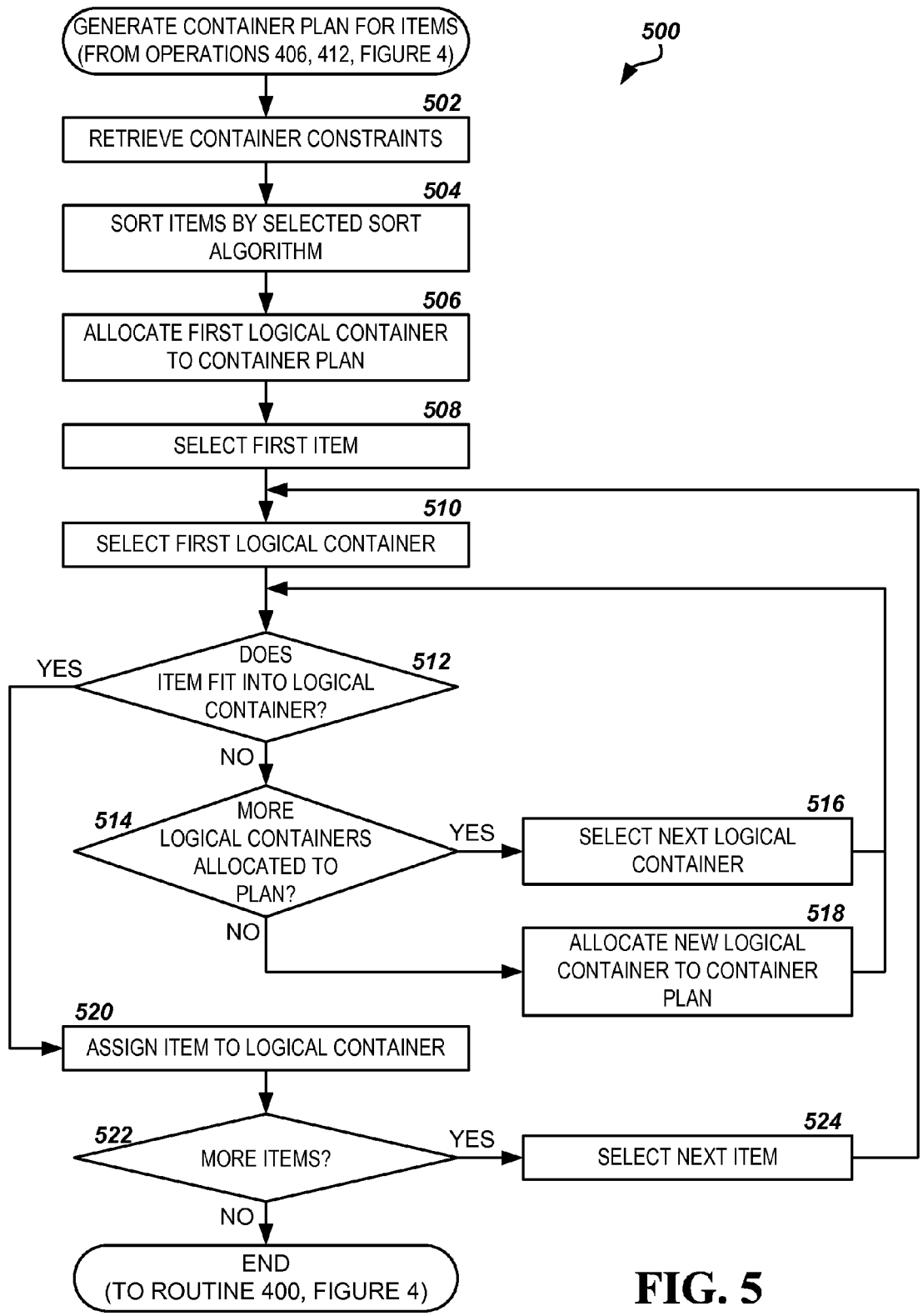
FIG. 5 is a flow diagram showing a method for generating a container plan for a group of items, according to embodiments described herein.

FIG. 5 illustrates a routine 500 for generating a container plan 110 for a specified group of items from an order 108, such as the items associated with a particular zone 222 or all items in the order regardless of zone, according to embodiments. In one embodiment, the routine 500 is performed by the cartonization module 106. It will be appreciated that the routine 500 may also be performed by another module or component of the merchant system 102, or by a combination of modules and components.

The routine 500 begins at operation 502, where the cartonization module 106 retrieves container constraints from the merchant system 102. The container constraints may specify the size, volume, and weight constraints of the shipping containers available for packing and shipping of the order 108. In one embodiment, the merchant may utilize a single size and type of shipping container associated with the same container constraints, such as the tote described above. Utilizing uniformly sized shipping containers may allow for an efficient cartonization algorithm. In other embodiments, differently sized shipping containers may be available for generating the container plan 110.

In a further embodiment, the container constraints may also be based on the zone associated with the items for which to generate the container plan 110, the delivery preferences 204 of the order 108, and other factors. For example, the volume constraint provided for a shipping container to be packed with chilled items may be based on the volume of the insulated bags in which the chilled items are to be placed and the number of insulated bags that can be placed into the container. In yet another embodiment, the container constraints may be set to a fraction of the actual volume and weight capacity of the shipping container in order to ensure that various packing materials and supplies can be accommodated.

From operation 502, the routine 500 proceeds to operation 504, where the cartonization module 106 sorts the items for which to generate the container plan 110 based on a selected sorting algorithm. The sorting algorithm may be selected based on the type of container plan 110 being generated, i.e. a zone-based container plan versus a mixed container plan, for example. The sorting algorithm may further be selected in order to optimize the picking and packing of the items in the order 108. In one embodiment, for zone-based container plans, the cartonization module 106 sorts the items first by weight, heaviest first, and then by volume, largest first. Sorting the items by weight and volume may allow the heavier and larger items to be better distributed amongst the logical shipping containers in the container plan, and may result in fewer actual shipping containers being required.

For mixed container plans 110, various sorting algorithms may be selected based on the type of optimization desired. For example, the cartonization module 106 may sort the items first by a pick location of each item along a pick path, then by weight, heaviest first, and then by volume, largest first, in order to optimize the picking and packing of the items for the order 108. In another example, the cartonization module 106 may first sort the items by zone 222, and then by weight and volume, in order to prioritize the placement of items from the same temperature zone, and thus requiring the same packing supplies 312, in the same containers. It will be appreciated that other sorting algorithms utilizing other combinations of elements may be utilized by the cartonization module 106 beyond those described herein. As described above in regard to operation 412, multiple mixed container plans 110 may be generated utilizing different sorting algorithms, with the preferred mixed plan selected based on the number of logical containers required in each plan, according to one embodiment.

The routine 500 then proceeds from operation 504 to operation 506, where the cartonization module 106 allocates a first logical shipping container to the container plan 110. This may be done by creating a container manifest 304 and assigning a logical container ID 306 to the container manifest, as described above in regard to FIG. 3. The routine 500 proceeds from operation 506 to operation 508, where the cartonization module 106 selects the first item from the sorted items to assign to a logical shipping container in the container plan 110. Next, the routine 500 proceeds to operation 510, where the cartonization module 106 selects the first logical shipping container allocated in operation 506.

From operation 510, the routine 500 proceeds to operation 512, where the cartonization module 106 determines if the selected item fits into the selected logical shipping container. This may be accomplished by using the container constraints retrieved in operation 502 and the inventory data 220 from the order items 210 corresponding to the selected item and other items already assigned to the selected logical shipping container according to the list of item SKUs 314A-314N in the corresponding container manifest 304. For example, the cartonization module 106 may add the weight 224 corresponding to the selected item to the total weight of the items currently assigned to the logical shipping container to determine if assigning the item to the logical shipping container would exceed the weight constraint of the container.

Similarly, the length 226, width 228, and height 230 corresponding to the selected item may be used to calculate a volume of the item, and this volume may be added to the total volume of the items currently assigned to the logical shipping container to determine if assigning the selected item to the logical shipping container would exceed the volume constraint of the container. It will be appreciated that the cartonization module 106 may use the inventory data 220 corresponding to the item, the container constraints, and other data to perform further calculations to determine if the selected item fits into the selected logical shipping container, such as checking the longest dimension of the item against the dimensions of the container, determining a geometrical packing scheme for the item and the other items currently assigned to the logical shipping container, and the like.

If the cartonization module 106 determines that the selected item does not fit into the selected logical shipping container, then the routine 500 proceeds from operation 512 to operation 514, where the cartonization module 106 determines if other logical shipping containers have been allocated to the container plan 110. This may be accomplished by determining if container manifests 304 exist in the container plan 110 beyond the container manifest corresponding to the selected logical shipping container. If more logical shipping containers are allocated to the container plan 110, then the routine 500 proceeds from operation 514 to operation 516, where the cartonization module 106 selects the next logical shipping container in the plan. The routine 500 then returns to operation 512 where the cartonization module 106 determines whether the selected item fits into the newly selected logical shipping container.

If, at operation 514, more logical shipping containers are not allocated to the container plan 110, then the routine 500 proceeds to operation 518, where the cartonization module 106 allocates a new logical shipping container to the container plan 110. As described above in regard to operation 506, this may be done by creating a corresponding container manifest 304 and assigning the next sequential logical container ID 306 to the container manifest. From operation 518, the routine 500 then returns to operation 512 where the cartonization module 106 determines whether the selected item fits into the newly allocated logical shipping container.

If the cartonization module 106 determines at operation 512 that the selected item does fit into the selected logical shipping container, then the routine 500 proceeds to operation 520, where the cartonization module 106 assigns the selected item to the selected logical shipping container in the container plan 110. This may be done by adding the SKU 212 from the order item 210 corresponding to the selected item to the list of item SKUs 314A-314N included in the container manifest 304 corresponding to the logical shipping container.

The routine proceeds from operation 520 to operation 522, where the cartonization module determines if there are more items to be assigned to logical shipping containers allocated to the container plan 110. If items are left to be assigned to logical shipping containers, the routine 500 proceeds from operation 522 to operation 524, where the cartonization module 106 selects the next item from the sorted items to be assigned to a logical shipping container. From operation 524, the routine 500 then returns to operation 512, where the procedure is repeated until all items for which the container plan 110 is to be generated have been assigned to logical shipping containers. If, at operation 522, no more items are left to be assigned to logical shipping containers, then the routine 500 ends.

Figure 6A:
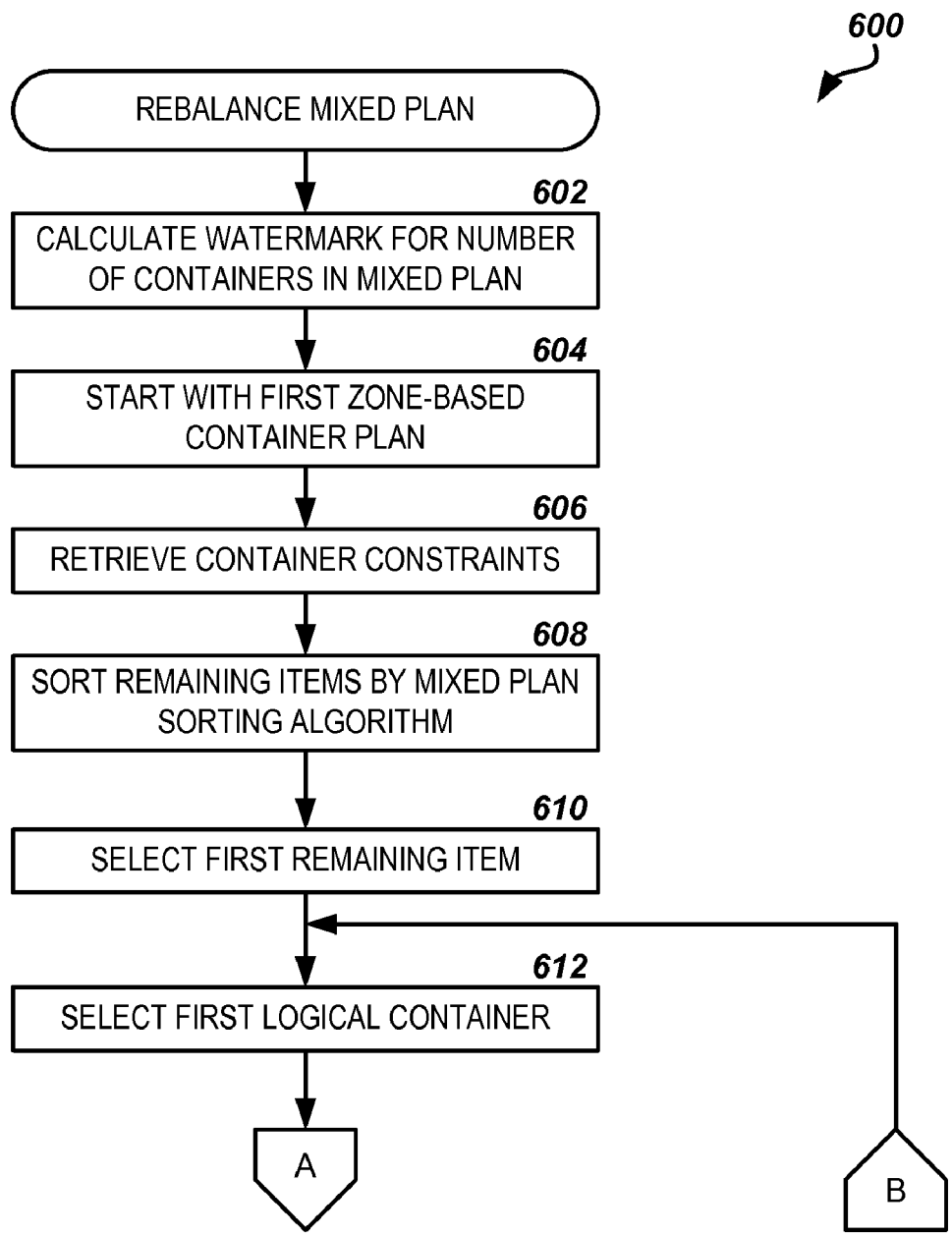
FIGS. 6A and 6B are flow diagrams showing a method for rebalancing a mixed container plan, according to embodiments described herein.
Figure 6B:
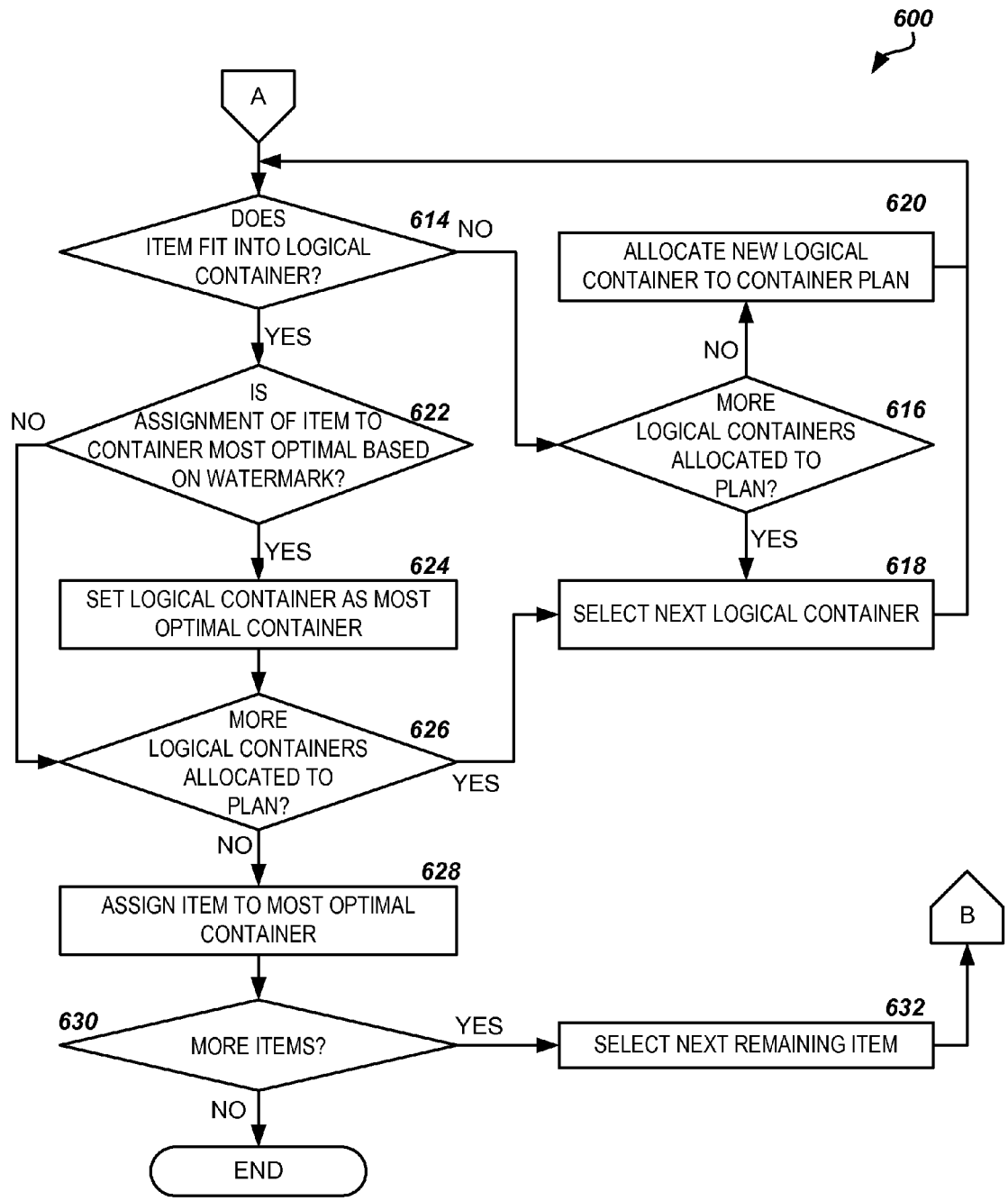

FIGS. 6A and 6B illustrate a routine 600 for rebalancing a mixed container plan 110 generated for an order 108, according to embodiments. Although the mixed container plan 110 generated in operation 412 may have fewer logical shipping containers than the combined number of containers in the zone-based plans, the mixed container plan may not be fully optimal. For example, it may be beneficial to pick, pack, and ship order items associated with each zone independently, at least to the extent possible without creating the need for additional shipping containers. Additionally, since the number of shipping containers needed to deliver the order 108 may be known from the generated mixed container plan 110, it may be beneficial to rebalance the items assigned to each logical shipping container so that each container has approximately the same weight, volume, or both, in order to further optimize shipping costs for the order.

In one embodiment, the routine 600 is performed by the cartonization module 106. It will be appreciated that the routine 600 may also be performed by another module or component of the merchant system 102, or by a combination of modules and components. As shown in FIG. 6A, the routine 600 begins at operation 602, where the cartonization module 106 calculates a "watermark" constraint for the logical shipping containers to be used in rebalancing the container plan 110. According to one embodiment, the watermark constraint represents the average total weight of the items assigned to a logical shipping container, and may be calculated by dividing the total weights 224 corresponding to all the items in the order 108 by the number of logical shipping containers allocated to the mixed container plan 110. In further embodiments, the watermark constraint may represent the average volume of the containers, or some other measure based on the number of logical shipping containers in the mixed container plan 110.

From operation 602, the routine 600 proceeds to operation 604, where the cartonization module 106 starts with the zone-based container plan 110 for one of the zones 222 associated with items in the order 108. For example, in generating a rebalanced container plan 110 for an order containing both chilled items and ambient items, the cartonization module 106 may first start with the zone-based container plan generated for the chilled items, and then assign ambient items in a balanced fashion to logical shipping containers in the zone-based container plan, allocating additional logical shipping containers to the rebalanced container plan as required. The cartonization module 106 may start the rebalanced container plan 110 by initially copying the container manifests 304 from the zone-based container plan 110 into the rebalanced plan, for example. The routine then proceeds to operation 606, where the cartonization module 106 retrieves the container constraints from the merchant system 102, as described above in regard to operation 502.

The routine 600 proceeds from operation 606 to operation 608, where the cartonization module 106 sorts the items in the order 108 that are not already assigned to a logical shipping container in the zone-based container plan 110 based on the sort algorithm selected to generate the mixed plan, as described above in regard to operation 504. Next, the routine 600 proceeds to operation 610, where the cartonization module 106 selects the first item from the sorted items to assign to a logical shipping container in the rebalanced container plan 110. The routine 600 then proceeds to operation 612, where the cartonization module 106 selects the first logical shipping container from the logical shipping containers copied from the zone-based container plan 110.

From operation 612, the routine 600 proceeds to operation 614, as shown in FIG. 6B, where the cartonization module 106 determines if the selected item fits into the selected logical shipping container. This may be accomplished by using the container constraints retrieved in operation 602 and the inventory data 220 from the order items 210 corresponding to the selected item and other items already assigned to the selected logical shipping container according to the list of item SKUs 314A-314N in the corresponding container manifest 304, as described above in regard to operation 512.

If the cartonization module 106 determines that the selected item does not fit into the selected logical shipping container, then the routine 600 proceeds from operation 614 to operation 616, where the cartonization module 106 determines if other logical shipping containers have been allocated to the rebalanced container plan 110. If more logical shipping containers are allocated to the rebalanced container plan 110, then the routine 600 proceeds from operation 616 to operation 618, where the cartonization module 106 selects the next logical shipping container in the plan. The routine 600 then returns to operation 614 where the cartonization module 106 again determines whether the selected item fits into the newly selected logical shipping container.

If, at operation 616, more logical shipping containers are not allocated to the container plan 110, then the routine 600 proceeds to operation 620, where the cartonization module 106 allocates a new logical shipping container to the rebalanced container plan 110. As described above in regard to operation 518, this may be done by creating a container manifest 304 and assigning the next sequential logical container ID 306 to the new container manifest, for example. From operation 620, the routine 600 then returns to operation 614 where the cartonization module 106 determines whether the selected item fits into the newly allocated logical shipping container.

If the cartonization module 106 determines at operation 614 that the selected item fits into the selected logical shipping container, then the routine 600 proceeds to operation 622, where the cartonization module 106 determines if the assignment of the selected item to the selected container is the most optimal assignment for the logical shipping containers so far evaluated based on the watermark constraint calculated in operation 602. In one embodiment, the cartonization module 106 determines the most optimal logical shipping container in the container plan 110 to which to assign the selected item by determining the assignment that will result in the logical shipping container being closest to the watermark constraint. It will be appreciated that other measures of most optimal assignment may be utilized by the cartonization module 106 beyond those described herein.

If the assignment of the selected item to the selected container is the most optimal assignment for the logical shipping containers so far evaluated, then the routine 600 proceeds from operation 622 to operation 624, where the cartonization module sets the selected logical shipping container as the most optimal container for assignment. This may be done by storing the logical container ID 306 from the corresponding container manifest 304 for the last, most optimal assignment. If the assignment of the selected item to the selected logical shipping container is not the most optimal assignment, then the routine 600 proceeds from operation 622 to operation 626, where the cartonization module 106 determines if other logical shipping containers have been allocated to the rebalanced container plan 110. If more logical shipping containers are allocated to the rebalanced container plan 110, then the routine 600 proceeds to operation 618, where the next logical shipping container in the plan is selected, and then returns to operation 614, where the cartonization module 106 determines whether the selected item fits into the next selected logical shipping container.

Once the optimal assignment has been evaluated for all logical shipping containers currently allocated to the rebalanced container plan 110, the routine 600 proceeds from operation 626 to operation 628, where the cartonization module 106 assigns the selected item to the logical shipping container determined to be the most optimal. This may be done by adding the SKU 212 from the order item 210 corresponding to the selected item to the list of item SKUs 314A-314N included in the container manifest 304 having the logical container ID 306 stored by the cartonization module 106 as the most optimal assignment.

From operation 628, the routine proceeds to operation 630, where the cartonization module 106 determines if there are more items to be assigned to logical shipping containers allocated to the rebalanced container plan 110. If items are left to be assigned to logical shipping containers, the routine 600 proceeds from operation 630 to operation 632, where the cartonization module 106 selects the next item from the sorted items to be assigned to a logical shipping container. From operation 632, the routine 600 then returns to operation 612, where the procedure is repeated until all items in the order 108 have been assigned to logical shipping containers in the rebalanced container plan 110. If, at operation 630, no more items are left to be assigned to logical shipping containers, then the routine 600 ends.

Figure 7:
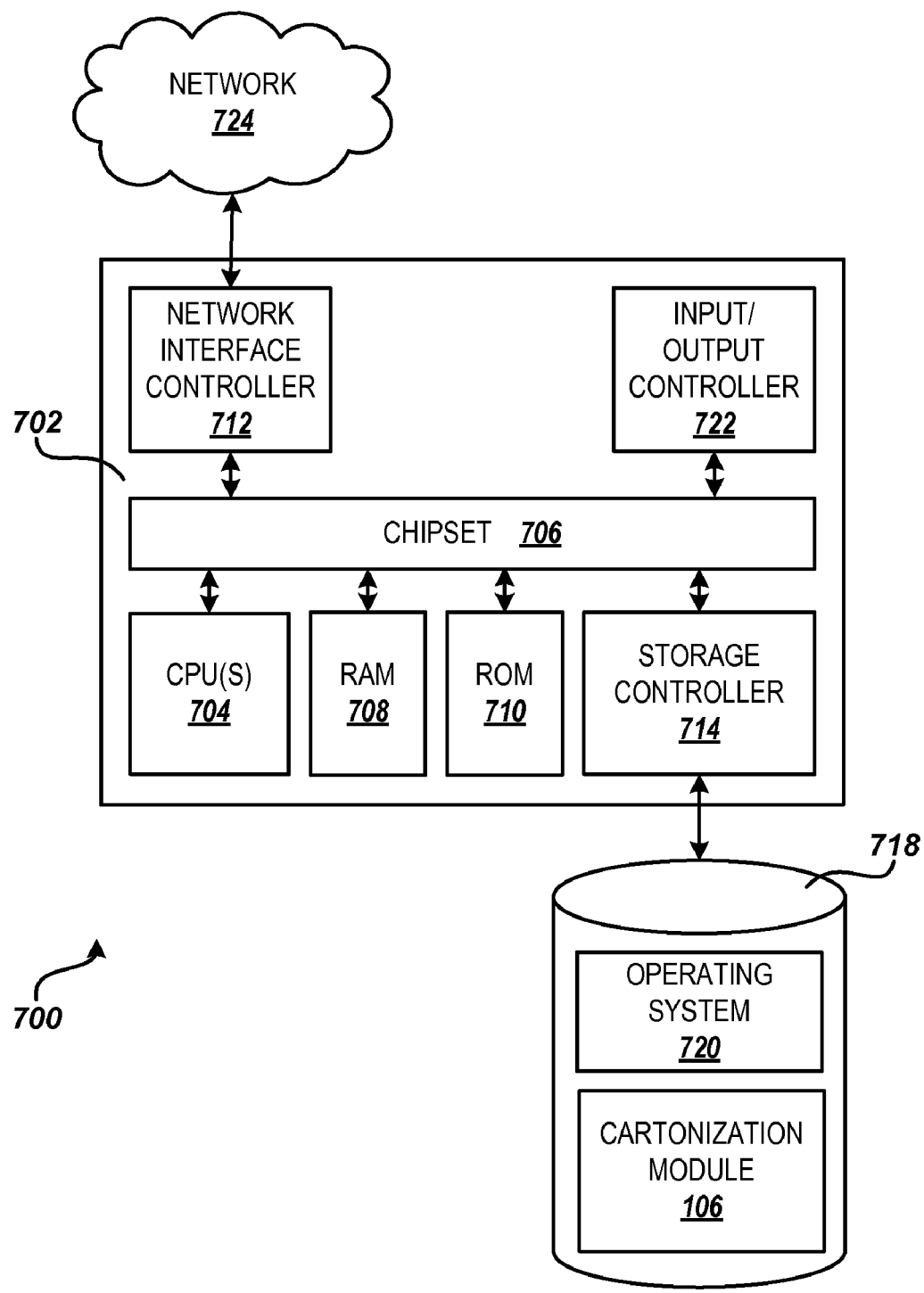
FIG. 7 is a computer architecture diagram showing an illustrative computer hardware architecture for computing devices described in embodiments presented herein.

FIG. 7 shows an example computer architecture 700 for a computer 702 capable of executing the software components described herein for generating container plans for multi-item orders, in the manner presented above. The computer architecture 700 shown in FIG. 7 illustrates a conventional server computer, workstation, desktop computer, laptop, network appliance, personal digital assistant ("PDA"), electronic book reader, digital cellular phone, or other computing device, and may be utilized to execute any aspects of the software components presented herein described as executing on the application servers 104 or other computing platform.

The computer 702 includes a baseboard, or "motherboard," which is a printed circuit board to which a multitude of components or devices may be connected by way of a system bus or other electrical communication paths. In one illustrative embodiment, one or more central processing units ("CPUs") 704 operate in conjunction with a chipset 706. The CPUs 704 are standard programmable processors that perform arithmetic and logical operations necessary for the operation of the computer 702.

The CPUs 704 perform the necessary operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 706 provides an interface between the CPUs 704 and the remainder of the components and devices on the baseboard. The chipset 706 may provide an interface to a random access memory ("RAM") 708, used as the main memory in the computer 702. The chipset 706 may further provide an interface to a computer-readable storage medium such as a read-only memory ("ROM") 710 or non-volatile RAM ("NVRAM") for storing basic routines that help to startup the computer 702 and to transfer information between the various components and devices. The ROM 710 or NVRAM may also store other software components necessary for the operation of the computer 702 in accordance with the embodiments described herein.

According to various embodiments, the computer 702 may operate in a networked environment using logical connections to remote computing devices and computer systems through a network 724, such as a local-area network ("LAN"), a wide-area network ("WAN"), the Internet, or any other networking topology known in the art that connects the computer 702 to remote computers. The chipset 706 includes functionality for providing network connectivity through a network interface controller ("NIC") 712, such as a gigabit Ethernet adapter. The NIC 712 is capable of connecting the computer 702 to other computing devices over the network 724, such as the data storage system 112, other application servers 104 in the merchant system 102, and the like. It should be appreciated that any number of NICs 712 may be present in the computer 702, connecting the computer to other types of networks and remote computer systems.

The computer 702 may be connected to a mass storage device 718 that provides non-volatile storage for the computer. The mass storage device 718 may store system programs, application programs, other program modules, and data, which are described in greater detail herein. The mass storage device 718 may be connected to the computer 702 through a storage controller 714 connected to the chipset 706. The mass storage device 718 may consist of one or more physical storage units. The storage controller 714 may interface with the physical storage units through a serial attached SCSI ("SAS") interface, a serial advanced technology attachment ("SATA") interface, a fiber channel ("FC") interface, or other standard interface for physically connecting and transferring data between computers and physical storage devices.

The computer 702 may store data on the mass storage device 718 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 718 is characterized as primary or secondary storage, and the like. For example, the computer 702 may store information to the mass storage device 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 702 may further read information from the mass storage device 718 by detecting the physical states or characteristics of one or more particular locations within the physical storage units.

In addition to the mass storage device 718 described above, the computer 702 may have access to other computer-readable storage mediums to store and retrieve information, such as program modules, data structures, or other data. It should be appreciated by those skilled in the art that computer-readable storage media can be any available media that may be accessed by the computer 702. By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information.

The mass storage device 718 may store an operating system 720 utilized to control the operation of the computer 702. According to one embodiment, the operating system comprises the LINUX operating system. According to another embodiment, the operating system comprises the WINDOWS® SERVER operating system from MICROSOFT Corporation of Redmond, Wash. According to further embodiments, the operating system may comprise the UNIX or SOLARIS operating systems. It should be appreciated that other operating systems may also be utilized.

The mass storage device 718 may store other system or application programs and data utilized by the computer 702, such as the cartonization module 106 described above in regard to FIG. 1. In one embodiment, the mass storage device 718 or other computer-readable storage media may be encoded with computer-executable instructions that, when loaded into the computer 702, may transform the computer from a general-purpose computing system into a special-purpose computer capable of implementing the embodiments described herein. These computer-executable instructions transform the computer 702 by specifying how the CPUs 704 transition between states, as described above. According to one embodiment, the computer 702 may have access to computer-readable storage media storing computer-executable instructions that, when executed by the computer, perform the routines 400, 500, and 600 for generating container plans for multi-item orders, as described above in regard to FIGS. 4-6B.

The computer 702 may also include an input/output controller 722 for receiving and processing input from a number of input devices, such as a keyboard, a mouse, a touchpad, a touch screen, an electronic stylus, or other type of input device. Similarly, the input/output controller 722 may provide output to a display device, such as a computer monitor, a flat-panel display, a digital projector, a printer, a plotter, or other type of output device. It will be appreciated that the computer 702 may not include all of the components shown in FIG. 7, may include other components that are not explicitly shown in FIG. 7, or may utilize an architecture completely different than that shown in FIG. 7.

Based on the foregoing, it should be appreciated that technologies for generating container plans for multi-item orders are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

What is claimed is:

1. A computer-readable non-transitory storage medium having computer-executable instructions stored thereon that, when executed by a computer, cause the computer to:
   divide a plurality of items in an order for delivery by zone, wherein the zone associated with an item is based on one or more of a picking zone and packaging requirements for the item;
   generate a zone-based container plan for each zone, wherein the zone-based container plan comprises an assignment of each item associated with the zone to one of one or more shipping containers allocated to the zone-based container plan based upon one or more of a weight and volume of each item assigned to the shipping container and a weight constraint and volume constraint associated with the shipping container;
   generate a mixed container plan for the order, wherein the mixed container plan comprises an assignment of each item in the order regardless of zone to one of one or more shipping containers allocated to the mixed container plan based upon one or more of a weight and volume of each item assigned to the shipping container and a weight constraint and volume constraint associated with the shipping container;
   determine if a number of shipping containers allocated to the mixed container plan is less than a combined number of shipping containers allocated to the zone-based container plans for all zones;
   upon determining that the number of shipping containers allocated to the mixed container plan is greater than or equal to the combined number of shipping containers allocated to the zone-based container plans for all zones, generate a final container plan by combining the zone-based container plans for all zones; and
   upon determining that the number of shipping containers allocated to the mixed container plan is less than the combined number of shipping containers allocated to the zone-based container plans for all zones, generate the final container plan based on the mixed container plan.

2. The computer-readable storage medium of claim 1, wherein items having a heaviest weight or largest volume are assigned to one of the one or more shipping containers before items having a lighter weight or smaller volume in generating the zone-based container plans or the mixed container plan.

3. The computer-readable storage medium of claim 1, wherein the one or more shipping containers allocated to the zone-based container plans and the mixed container plan are all substantially the same size and are all associated with the same weight constraint and volume constraint.

4. The computer-readable storage medium of claim 1, wherein generating the final container plan comprises determining packing supplies for each of the one or more shipping containers allocated to the container plan based on one or more of the zones associated with the items assigned to the shipping container and delivery preferences of the order.

5. The computer-readable storage medium of claim 1, wherein generating the final container plan based on the mixed container plan comprises executing computer-executable instructions that cause the computer to:
   calculate a watermark constraint for the shipping containers based on the items in the order and the number of shipping containers in the mixed container plan;
   initially create the final container plan from the zone-based container plan generated for a first zone; and
   for each item in the order not assigned to a shipping container in the zone-based container plan, assign the item to one of the one or more shipping containers allocated to the final container plan based in part upon the watermark constraint calculated for the shipping containers.

6. The computer-readable storage medium of claim 5, wherein the watermark constraint is calculated by dividing a total weight of the items in the order by the number of shipping containers allocated to the mixed container plan.

7. The computer-readable storage medium of claim 1, wherein the items in the order are grocery items.

8. A computer-implemented method of generating a container plan for a multi-item order in a merchant system, the method comprising:
- dividing, by one or more computers in the merchant system, items in the order by zone, wherein the zone associated with an item is based on one or more of a picking zone and packaging requirements for the item;
- generating, by the one or more computers, a zone-based container plan for each zone, wherein the zone-based container plan comprises an assignment of each item associated with the zone to one of one or more shipping containers allocated to the zone-based container plan;
- generating, by the one or more computers, a mixed container plan for the order, wherein the mixed container plan comprises an assignment of each item in the order regardless of zone to one of one or more shipping containers allocated to the mixed container plan;
- selecting, by the one or more computers, between the mixed container plan and the zone-based container plans based at least in-part on a comparison between a number of shipping containers allocated to the mixed container plan and a combined number of shipping containers allocated to the zone-based container plans for all zones;
- upon selecting the zone-based container plans, generating, by the one or more computers, a final container plan by combining the zone-based container plans for all zones; and
- upon selecting the mixed container plan, generating, by the one or more computers, the final container plan from the mixed container plan.

9. The computer-implemented method of claim 8, wherein generating a container plan comprises assigning each item to one of the one or more shipping containers allocated to the container plan based upon one or more of a weight and volume of each item assigned to the shipping container and a weight constraint or volume constraint associated with the shipping container.

10. The computer-implemented method of claim 9, wherein the items having a heaviest weight or largest volume are assigned to one of the one or more shipping containers before the items having a lighter weight or smaller volume.

11. The computer-implemented method of claim 9, wherein the one or more shipping containers are all substantially the same size and are all associated with the same weight constraint and/or volume constraint.

12. The computer-implemented method of claim 9, wherein generating the mixed container plan for the order comprises first sorting the items in the order according to a pick location of each item along a pick path, then by the weight of each item, and then by the volume of each item.

13. The computer-implemented method of claim 9, wherein generating the mixed container plan for the order comprises first sorting the items by the zone associated with each item, then by the weight of each item, and then by the volume of each item.

14. The computer-implemented method of claim 8, wherein generating the final container plan comprises determining packing supplies for each of the one or more shipping containers allocated to the container plan based on one or more of the zones associated with the items assigned to the shipping container and delivery preferences of the order.

15. The computer-implemented method of claim 8, wherein generating the final container plan from the mixed container plan comprises rebalancing the mixed container plan by:
- calculating, by the one or more computers, a watermark constraint for the shipping containers based on the items in the order and the number of shipping containers in the mixed container plan;
- initially creating, by the one or more computers, the final container plan from the zone-based container plan generated for a first zone; and
- for each item in the order not assigned to a shipping container in the zone-based container plan, assigning, by the one or more computers, the item to one of the one or more shipping containers allocated to the final container plan based in part upon the watermark constraint calculated for the shipping containers.

16. The computer-implemented method of claim 15, wherein the watermark constraint is calculated by dividing a total weight of the items in the order by the number of shipping containers allocated to the mixed container plan.

17. A system for generating a container plan for a multi-item order, the system comprising:
- a server computer comprising a memory and one or more processing units; and
- a cartonization module residing in the memory and configured to cause the one or more processing units to:
  - generate a plurality of zone-based container plans for a number of zones associated with items in an order, wherein each zone-based container plan comprises an assignment of each item associated with the zone to one of one or more logical shipping containers allocated to the zone-based container plan,
  - generate a mixed container plan for the order, wherein the mixed container plan comprises an assignment of each of the items item in the order to one of one or more logical shipping containers allocated to the mixed container plan,
  - select between the mixed container plan and the zone-based container plans based at least in-part on a comparison between a number of logical shipping containers allocated to the mixed container plan and a combined number of logical shipping containers allocated to the zone-based container plans for all zones,
  - upon selecting the zone-based container plans, generate a final container plan by combining the zone-based container plans for all zones,
  - upon selecting the mixed container plan, generate the final container from the mixed container plan, and
  - determining packing supplies for each of the one or more logical shipping containers allocated to the final container plan based on one or more of the zones associated with the items assigned to the logical shipping container and delivery preferences of the order, wherein the logical shipping containers represent shipping containers of a particular size and associated with particular weight constraint and volume constraint.

18. The system of claim 17, wherein generating a container plan comprises assigning each item to one of the one or more logical shipping containers allocated to the container plan based upon one or more of a weight and volume of each item assigned to the logical shipping container and the weight constraint or volume constraint associated with the logical shipping container.

19. The system of claim 17, wherein items having a heaviest weight or largest volume are assigned to one of the one or more logical shipping containers before items having a lighter weight or smaller volume in generating the plurality of zone-based container plans or the mixed container plan.

20. The system of claim 17, wherein generating the final container plan from the mixed container plan comprises rebalancing the mixed container plan by executing computer-executable instructions that cause the one or more processing units to:

calculate a watermark constraint for the logical shipping containers based on the items in the order and the number of logical shipping containers in the mixed container plan;

initially create the final container plan from the zone-based container plan generated for a first zone; and for each item in the order not assigned to a logical shipping container in the zone-based container plan, assign the item to one of the one or more logical shipping containers allocated to the final container plan based in part upon the watermark constraint calculated for the shipping containers.

21. The system of claim 20, wherein the watermark constraint is calculated by dividing a total weight of the items in the order by the number of shipping containers allocated to the mixed container plan.

\* \* \* \* \*